Patented Oct. 7, 1930

1,777,738

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

PROCESS OF VULCANIZING RUBBER AND PRODUCT THEREBY OBTAINED

No Drawing.   Application filed February 24, 1928.   Serial No. 256,801.

The present invention relates to a process of manufacturing vulcanized rubber of high quality, and it has, for its primary object, the provision of accelerators of characteristic curing powers, which may be employed in the production of such rubber.

Mercapto-benzo-thiazole having the formula

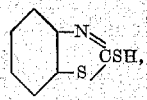

and which is one of the many reaction products obtained by heating a mixture of thiocarbanilide and sulfur, has been described as a rubber vulcanization accelerator of some value, but I have now found that its usefulness can be greatly increased by reacting it with certain other compounds which are hereinafter fully described and using the materials so obtained as accelerators.

Mercapto compounds are somewhat acidic in nature, due to the presence of the —SH group contained therein, and will therefore form salts with various metals, and will also react with the more stable and less volatile of organic bases to form compounds which may be termed salts, and which themselves possess particularly high value as accelerators of the rubber vulcanization process as is hereinafter set forth. Certain of the metallic salts of mercapto compounds have already been described as vulcanization accelerators, but my invention is concerned with the use of the more powerful accelerating materials hereinafter described in detail. In fact, I may conclude from the experiments hereinafter set forth in more detail, that a mercaptan or a derivative of a mercaptan, to display its accelerating properties to the greatest degree, preferably should have within the molecule, some group or grouping which will tend more or less completely to counteract the acidic nature of the —SH group. Extensive experimentation, carried out on this problem, as evidenced by the characteristic examples hereinafter described, indicates that when a mercaptan compound is so treated as to decrease its natural acidity, or conversely, to increase its basicity, the accelerating action of the modified mercaptan is considerably improved.

Various types of organic materials may be employed to decrease the acidic nature of mercapto compounds. Thus, for example, one important class of bases which may be employed to react with the mercaptans to produce compounds having vulcanization accelerating properties, is biguanide having the formula

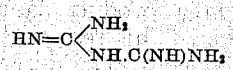

and its derivatives, particularly the aryl derivatives. For example, triphenylbiguanide having the formula

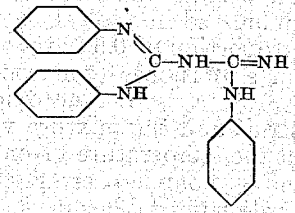

and a mercaptan may be heated together, preferably in equimolecular proportions at a temperature slightly above the melting point of the materials for a period of about an hour, and a resinous material is obtained upon allowing the mixture to cool. This product, after grinding, is incorporated in the proportion of 0.5 parts of accelerator into a mix comprising 100 parts of rubber, 5 parts of zinc oxide and 3.5 parts of sulfur and the rubber compound vulcanized in a press in the usual manner for about an hour at the temperature given by 20 pounds of steam per square inch. The resulting product was found to possess a tensile strength at break of about 3000 pounds per square inch. This same accelerator may likewise be used for the manufacture of a tread stock comprising 51 parts of rubber (smoked sheets), 20 parts of zinc oxide, 19 parts of carbon black, 3.5 parts of mineral rubber, 1.5 parts of sulfur, and 0.25 parts of accelerator. The product, after vulcanizing in a press, under the temperature given by 40 pounds steam pressure per square inch, for about an hour, was found to possess a tensile strength of approximately 3215 pounds per square inch, and an ultimate elongation of about 563%. Products possessing a greater tensile strength may readily be prepared by using a larger amount of accelerator, and preferably with a proportionate decrease in sulfur.

As another example of my preferred type of accelerators, ortho-tolyl-biguanide having the formula

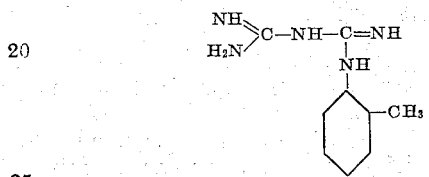

and mercapto-benzo-thiazole having the formula

may be heated together, preferably in equimolecular proportions at a temperature of 100° C. to 105° C. at which temperature they fuse and form a product solidifying to a resin on cooling. This resin is hard and can be ground when cold. Grinding is not necessary for compounding purposes, however, as the product fluxes readily into the rubber. The reaction product obtained as described may be compounded in the well known manner in the proportion of 0.5 parts of accelerator, 100 parts of rubber (for example pale crepe rubber) 5 parts of zinc oxide, and 3 parts of sulfur, and the mixture vulcanized in a press at the temperature given by steam under 20 and 40 pounds pressure per square inch. The following table shows the results of the tensile tests obtained by testing sheets of rubber vulcanized in a press for different periods of time at the temperatures obtained from 20 and 40 pounds of steam pressure per square inch.

| Time of cure minutes | Pressure pounds steam | Modulus of elasticity in lbs./in.² at elongations of— | | | Tensile at break | Elongation at break |
|---|---|---|---|---|---|---|
| | | 300% | 500% | 700% | | |
| 15 | 20 | 78 | 134 | 323 | 1598 | 1000 |
| 30 | 20 | 148 | 275 | 945 | 2335 | 855 |
| 60 | 20 | 179 | 386 | 1440 | 2945 | 825 |
| 15 | 40 | 162 | 287 | 1000 | 2745 | 870 |
| 60 | 40 | 183 | 421 | 1563 | 2720 | 795 |

As another example of my preferred type of accelerators monophenyl-biguanide having the formula

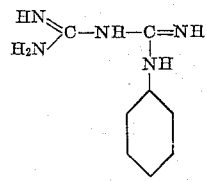

and mercapto-benzo-thiazole having the formula

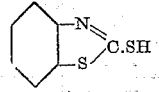

may be heated together, preferably in equimolecular proportions, at a temperature of approximately 160° C. for about one hour at which temperature they fuse and form a product which resinifies on cooling. The reaction product obtained as described may be compounded in the well known manner in the proportion of 0.5 parts of accelerator, 100 parts of rubber, for example smoked sheets, 5 parts of zinc oxide and 2.75 parts of sulfur, and the mixture vulcanized in a press at the temperature given by steam under 40 pounds pressure per square inch. The following table shows the results of the tensile tests obtained by testing sheets of rubber vulcanized in a press for different periods of time at the temperature obtained from 40 pounds of steam pressure per squire inch.

| Time of cure minutes | Pressure pounds steam | Modulus of elasticity in lbs./in.² at elongations of— | | | Tensile at break | Elongation at break |
|---|---|---|---|---|---|---|
| | | 300% | 500% | 700% | | |
| 15 | 40 | 195 | 479 | 1620 | 2750 | 810 |
| 30 | 40 | 210 | 516 | 1730 | 2930 | 810 |
| 45 | 40 | 228 | 520 | 1733 | 3000 | 770 |
| 60 | 40 | 199 | 475 | 1605 | 3070 | 830 |

It is apparent that the optimum cure for the stock set forth is realized after heating for about 15 minutes under the conditions set forth. It is further noted there was no deterioration or reversion of the rubber on continued heating over a period of an hour.

A tread stock using the reaction product of mercapto-benzo-thiazole and monophenyl-biguanide as an accelerator was made up according to the following formula:

| | Parts |
|---|---|
| Smoked sheet rubber | 51 |
| Zinc oxide | 20 |
| Carbon black | 19 |
| Mineral rubber | 3.5 |
| Sulfur | 1.5 |
| Accelerator | 0.25 |

The results of the tensile tests obtained by testing sheets of the above rubber vulcanized in a press for different periods of time at the temperature obtained from 40 pounds of steam pressure per square inch are given in the following table:

| Time of cure minutes | Pressure pounds steam | Modulus of elasticity in lbs./in.² at elongations of— | | Tensile at break | Elongation at break |
|---|---|---|---|---|---|
| | | 300% | 500% | | |
| 30 | 40 | 1050 | 2490 | 2965 | 573 |
| 45 | 40 | 1198 | 2685 | 3170 | 560 |
| 60 | 40 | 1228 | 2750 | 3215 | 563 |

A hard rubber was prepared as follows:

| | Parts |
|---|---|
| Smoked sheets | 100.0 |
| Zinc oxide | 15.0 |
| Sulfur | 35.0 |
| Reaction product of mercapto-benzo-thiazole and monophenyl-biguanide | 2.0 |

A good hard rubber product was obtained by vulcanizing the above stock for 1 hour, 30 minutes at 50 pounds of steam pressure per square inch. The guanyl-ureas, iso-ureas, thio-ureas and iso-thio-ureas are examples of other organic basic substances that may be reacted with non-volatile mercaptans to form compounds that are stable in the dry state. Guanyl-urea having the formula

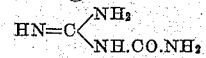

for example reacts with mercapto-benzo-thiazole or with mercapto-benzoxozole, and the like compounds to form products that possess desirable vulcanization accelerating properties. Mono-phenyl-guanyl-thiourea or di-ethyl-guanyl-thioureas may also be reacted with the mercapto compounds to produce accelerators of the type hereinbefore described.

Furthermore, it is to be understood that while I have specifically mentioned mercapto-benzo-thiazole as an example of a mercaptan, other compounds may, as I have found, be used successfully for the preparation of my preferred type of accelerators. Thus, I may use, as a mercaptan compound, aromatic mercaptans, such as thiophenol, thiocresol and the like; benzothiazole mercaptans and substitution products thereof, such as mercapto-tolyl-thiazole; the naphthyl-thiazole-mercaptans; thiooxy-indole

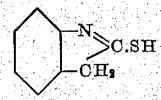

and substitution products thereof; amido-thiophenols and derivatives; 2-mercapto-thiazolin

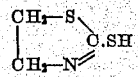

and derivatives; the thio-anilides

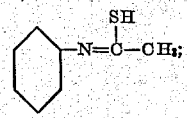

2 - mercapto - benzimidazol; mercapto-iminazole

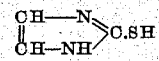

the thioamides, and such compounds as thio-ammelin

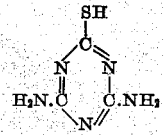

that is mercapto compounds preferably of the aromatic series.

The invention is to be understood as not limited to the exact procedure followed or proportions employed in the foregoing examples, which are illustrative only and not limitative of my invention. Moreover, the invention is to be considered as not limited by any theories advanced in explanation of the chemical changes involved in the manufacture of the compounds set forth but is limited solely by the claims attached hereto as a part of this specification wherein I intend to claim all novelty inherent in my invention as is permissible in view of the prior art.

What is claimed is:

1. The process of vulcanizing rubber which comprises heating a mixture of rubber and sulfur in the presence of a vulcanization accelerator comprising the reaction product of mercapto-benzo-thiazole and mono-phenyl-biguanide.

2. The vulcanized rubber product produced by heating rubber and sulfur in the presence of a vulcanization accelerator comprising the reaction product of mercapto-benzo-thiazole and mono-phenyl-biguanide.

3. The process of vulcanizing rubber which comprises heating rubber and sulfur in the presence of a vulcanization accelerator comprising the reaction product of substantially equal-molecular proportions of mercapto-benzo-thiazole and mono-phenyl-biguanide.

4. The vulcanized rubber product produced by heating rubber and sulfur in the presence of a vulcanization accelerator comprising the reaction product of substantially equal molecular proportions of mercapto-benzo-thiazole and mono-phenyl-biguanide.

In testimony whereof I hereunto affix my signature.

WINFIELD SCOTT.